(12) United States Patent
Kawahara et al.

(10) Patent No.: US 11,251,877 B2
(45) Date of Patent: Feb. 15, 2022

(54) OPTICAL RECEPTION DEVICE

(71) Applicant: Nippon Telegraph and Telephone Corporation, Tokyo (JP)

(72) Inventors: Hiroki Kawahara, Tokyo (JP); Hiroshi Yamamoto, Tokyo (JP); Katsuhiro Araya, Tokyo (JP); Yoshihiko Uematsu, Tokyo (JP); Toshiyuki Oka, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/058,945

(22) PCT Filed: May 22, 2019

(86) PCT No.: PCT/JP2019/020215
§ 371 (c)(1),
(2) Date: Nov. 25, 2020

(87) PCT Pub. No.: WO2019/230513
PCT Pub. Date: Dec. 5, 2019

(65) Prior Publication Data
US 2021/0218474 A1    Jul. 15, 2021

(30) Foreign Application Priority Data

May 29, 2018  (JP) .............................. JP2018-102114

(51) Int. Cl.
*H04B 10/61* (2013.01)
*H04B 10/60* (2013.01)
(Continued)

(52) U.S. Cl.
CPC ......... *H04B 10/61* (2013.01); *H04B 10/2575* (2013.01); *H04B 10/60* (2013.01); *H04J 14/00* (2013.01)

(58) Field of Classification Search
CPC .... H04B 10/61; H04B 10/079; H04B 10/564; H04Q 11/00
(Continued)

(56) References Cited

U.S. PATENT DOCUMENTS

| 8,285,148 B2 * | 10/2012 | Haunstein | ............ H04B 10/614 |
|---|---|---|---|
| | | | 398/193 |
| 8,320,764 B2 * | 11/2012 | Charlet | .............. H04B 10/6163 |
| | | | 398/105 |

(Continued)

OTHER PUBLICATIONS

Emmerich et al., "Colorless C-Band WDM System Enabled by Coherent Reception of 56-GBd PDM-16QAM Using an High-Bandwidth ICR with TIAs," OFC, Mar. 19, 2017, 3 pages.
(Continued)

*Primary Examiner* — Abbas H Alagheband
(74) *Attorney, Agent, or Firm* — Fish & Richardson P.C.

(57) ABSTRACT

[Problem] It is possible to cancel out beat noises in a WDM signal to obtain a high-quality signal component, and a configuration thereof is achieved with low mounting costs. [Solution] An optical reception device converts a WDM signal rs(t) of an optical signal to electrical signals d(t)1 to d(t)n expressed as complex numbers of orthogonal phases, cancels out beat noises from the electrical signals, and then demodulates the signals to obtain signals D1 to Dn of a transmission source. This optical reception device includes an absolute value calculation units 31$a$ to 31$n$ that generate a signal component including a beat noise component through absolute value squaring calculation processing for squaring an absolute value of the electrical signal, scaling units 32$a$ to 32$n$ that multiply the generated beat noise component by a proportional constant to restore beat noise associated with n types of wavelengths in the electrical signal, and subtraction units 33$a$ to 33$n$ that subtract the n
(Continued)

type of beat noises restored from the electrical signal to cancel out then types of beat noises included in the electrical signal.

5 Claims, 6 Drawing Sheets

(51) Int. Cl.
*H04B 10/2575* (2013.01)
*H04J 14/00* (2006.01)

(58) Field of Classification Search
USPC .......................................................... 398/79
See application file for complete search history.

(56) References Cited

U.S. PATENT DOCUMENTS

| | | | | |
|---|---|---|---|---|
| 8,355,637 | B2* | 1/2013 | Sano | H04L 25/03159 398/204 |
| 8,437,645 | B2* | 5/2013 | Botti | H04B 10/6161 398/208 |
| 8,768,173 | B2* | 7/2014 | Tanimura | H04B 10/61 398/158 |
| 9,106,359 | B2* | 8/2015 | Kato | G02F 1/353 |
| 2006/0028712 | A1* | 2/2006 | Ohtsuki | H01S 3/06708 359/337 |
| 2011/0002689 | A1* | 1/2011 | Sano | H04L 25/03159 398/44 |
| 2012/0148264 | A1* | 6/2012 | Liu | H04L 27/2697 398/202 |
| 2012/0177383 | A1* | 7/2012 | Tanimura | H04B 10/61 398/158 |
| 2015/0023674 | A1* | 1/2015 | Salsi | H04B 10/2575 398/202 |
| 2015/0341138 | A1* | 11/2015 | Ishihara | H04B 10/2513 398/35 |
| 2017/0310392 | A1* | 10/2017 | Boertjes | H04B 10/0793 |
| 2019/0280774 | A1* | 9/2019 | Nazarathy | G02B 6/28 |

OTHER PUBLICATIONS

Huang et al., "Filterless Reception of 80x112-GB/s WDM Channels Using Single-Ended Photodiodes and Digital Interference Reduction," ECOC Technical Digest, Sep. 16, 2012, 3 pages.

Kawahara et al., "Investigation of Colorless Detection Penalty with Balanced Receiver for Wavelength Multiplexed Transmission of 64Gbaud 64QAM signal," Conununications Society of Japan General Meeting, Mar. 20, 2018, 3 pages (with English Translation).

Zhang et al., "Towards full band colorless reception with coherent balanced receivers," Optics Express, Apr. 2012, 20(9):10339-10352.

* cited by examiner

Prior Art

OPTICAL RECEPTION DEVICE

CROSS-REFERENCE TO RELATED APPLICATIONS

This application is a National Stage application under 35 U.S.C. § 371 of International Application No. PCT/JP2019/020215, having an International Filing Date of May 22, 2019, which claims priority to Japanese Application Serial No. 2018-102114, filed on May 29, 2018. The disclosure of the prior application is considered part of the disclosure of this application, and is incorporated in its entirety into this application

TECHNICAL FIELD

The present invention relates to an optical reception device that is used for an optical transmission system using a wavelength division multiplexing (WDM) scheme, receives a WDM signal, and obtains signal components having various wavelengths.

BACKGROUND ART

To economize an optical transmission system that uses a WDM signal in optical communication, a colorless reception scheme capable of reducing the number of optical components in an optical reception device has been proposed, for example, in Non Patent Literature 1. In the colorless reception scheme, a plurality of signals multiplexed in the WDM signal are received as they are, and the received signals having a predetermined wavelength are selected by local oscillation light (referred to as local light). Thus, wavelength filters are unnecessary, the number of multiplexers and demultiplexers can be reduced, and the number of wavelength variable filters and the like in a colorless, directionless and contentionless-reconfigurable optical add/drop multiplexer (CDC-ROADM) can be reduced.

Examples of the optical transmission system using the WDM signal include a system based on a colorless reception scheme using balanced detection described in Non Patent Literature 2. In this system, inter-signal beat noise described below superposed on the WDM signal is canceled out by two of the same photodiodes that convert the WDM signal from light into electricity. The inter-signal beat noise (also referred to as beat noise) is generated due to superposition of noise of other signals on an own signal.

FIG. 5 illustrates a configuration of an optical reception device 10A based on the colorless reception scheme using balanced detection, and a description thereof will be given.

The optical reception device 10A includes n optical hybrid units 11a, 11b, . . . , 11m, and 11n, n local light sources 12a, 12b, . . . , 12m, and 12n, the same photodiodes (PDs) 13I1 and 13I2 connected to a pair of I channel ports (referred to as I ports) on the output side of the respective optical hybrid units 11a to 11n, and the same PDs 13Q1 and 13Q2 connected to a pair of Q channel ports (Q ports) on the output side of the respective optical hybrid units 11a to 11n.

Further, the optical reception device 10A includes, on the output side of each of the optical hybrid units 11a to 11n, a subtraction unit 14I connected to output sides of the pair of PDs 13I1 and 13I2 of the I channel, a subtraction unit 14Q connected to the pair of PDs 13Q1 and 13Q2 of the Q channel, and n demodulation units 15a, 15b, . . . , 15m, and 15n.

All of WDM signals, which are optical signals to be input to the respective optical hybrid units 11a to 11n, are the same signals, and have a signal configuration in which signals having n types of different wavelengths are multiplexed. In other words, the WDM signal has a signal configuration in which a first signal having a first wavelength to an n-th signal having an n-th wavelength are multiplexed.

The respective local light sources 12a to 12n emit local light of different wavelengths and input the local light to the optical hybrid units 11a to 11n. The local light source 12a emits local light having the first wavelength and inputs the local light to the optical hybrid unit 11a, the local light source 12b emits local light having the second wavelength and inputs the local light to the optical hybrid unit 11b, . . . , the local light source 12m emits local light having the m-th wavelength and inputs the local light to the optical hybrid unit 11m, and the local light source 12n emits local light having the n-th wavelength and inputs the local light to the optical hybrid units 11n.

The optical hybrid unit 11a extracts the first signal having the first wavelength which is the same as the local light from the WDM signal by causing the input WDM signal and the local light having the first wavelength input from the local light source to optically interfere in an optical waveguide, and outputs the extracted first signal from the I port and the Q port, with phases of the first signal being shifted by 90 degrees (with the phases being made orthogonal).

Each optical hybrid unit includes two I ports and two Q ports. The same first signal of an I channel is output from the two I ports, and the same first signal of a Q channel orthogonal in phase to the first signal of the I channel is output from the two Q ports. In the other optical hybrid units 11b to 11n, the processing is the same, with the signal wavelengths being different.

The signals output from the two I ports in each of the optical hybrid units 11a to 11n are output to the respective PDs 13I1 and 13I2, converted from the optical signals to electrical signals, and output to the subtraction unit 14I. Similarly, the signals output from the two Q ports are output to the respective PDs 13Q1 and 13Q2, converted from the optical signals to electrical signals, and output to the subtraction unit 14Q.

The subtraction unit 14I on the I-channel side performs subtraction processing for subtracting two electrical signals of the I channel so that beat noise is canceled out, and outputting only a signal component of the I channel (a signal component in an I axis direction). Similarly, the subtraction unit 14Q on the Q channel side performs subtraction processing for subtracting two electrical signals of the Q channel so that beat noise is canceled out, and outputting only a signal component of the Q channel (a signal component in a Q axis direction).

Thus, the signal component of the I channel is output from the subtraction unit 14I on the I channel side, and the signal component of the Q channel is output from the subtraction unit 14Q on the Q channel side. The signal component of the I channel and the signal component of the Q channel are input to the demodulation units 15a to 15n in a state in which the signal components are plotted on a complex plane with orthogonal I and Q axes, that is, as complex values (referred to as complex signals).

The demodulation units 15a to 15n demodulate the input complex signals having the respective wavelengths, and output a first signal to an n-th signal, which are signal components having respective wavelengths of a transmission source.

With this optical reception device 10A, it is possible to extract only the signal component by canceling out the beat noise superposed on the WDM signal.

Next, examples of an optical transmission system using a WDM signal include a system based on a digital coherent WDM transmission scheme using single type detection described in Non Patent Literature 3. This system can cancel out the beat noise from each selected light, which is associated with the colorless reception, and can be achieved in a simple configuration.

FIG. 6 illustrates a configuration of an optical reception device 10B based on the digital coherent WDM transmission scheme using single type detection, and a description thereof will be given. Here, in FIG. 6, components corresponding to those in FIG. 5 are denoted by the same reference signs.

The optical reception device 10B includes then optical hybrid units 11a to 11n, n local light sources 12a to 12n, PDs 13I connected to I ports on the output side of the respective optical hybrid units 11a to 11n, PDs 13Q connected to Q ports on the output side of the respective optical hybrid units 11a to 11n, and a PD 16 to which a WDM signal is input directly.

Further, the optical reception device 10B includes respective demodulation units 17a to 17n each connected to a pair of PDs 13I and 13Q, a demodulation unit 18 connected to the PD 16, and a sampling clock supply unit (referred to as a supply unit) 19.

The optical hybrid unit 11a extracts a first signal having a first wavelength that is the same as local light from the WDM signal as described above, and outputs the extracted first signal to the PD 13I and the PD 13Q from the I port and the Q port, with phases of the first signal being made orthogonal. The other optical hybrid units 11b to 11n also perform the same processing, with only the signal wavelengths being different.

The signal output from the I port in each of the optical hybrid units 11a to 11n is converted from the optical signal to an electrical signal in the PD 13I. Similarly, the signal output from the Q port is converted from the optical signal to an electrical signal in the PD 13Q. A signal of I and Q channels for each wavelength converted to the electrical signal, that is, first to n-th signals of the I and Q channels are input as complex signals to the demodulation units 17a to 17n.

The supply unit 19 synchronously outputs a clock signal CK for sampling to the respective demodulation units 17a to 17n.

The PD 16 converts the WDM signal from an optical signal to an electrical signal and inputs the electrical signal to the demodulation unit 18.

The demodulation unit 18 demodulates the WDM signal, which is the electrical signal, and outputs only beat noise 20 to the respective demodulation units 17a to 17n in synchronization with the clock signal CK.

The respective demodulation units 17a to 17n demodulate the respective complex signals associated with the first to n-th signals, subtract the beat noise 20 output from the demodulation unit 18 from the demodulated signal including the beat noise to cancel out the beat noise, and output only the signal components. Thereby, the first to n-th signals, which are signal components having respective wavelengths, are output from the respective demodulation units 17a to 17n.

With this optical reception device 10B, it is possible to reduce the number of PDs to half as compared to the optical reception device 10A described above and reduce mounting costs.

CITATION LIST

Non Patent Literature

Non Patent Literature 1: B. Zhang, et. al., "Optics Express", vol. 20, no. 9, [online], 2012, [retrieved on May 19, 2018], Internet <URL: https://www.osapublishing.org/oe/issue.cfm?issue=9&volume=20>

Non Patent Literature 2: R. Emmerich, et. al., "Colorless C-Band WDM System Enabled by Coherent Reception of 56-GBd PDM-16QAM Using an High-Bandwidth ICR with TIAs", [online], 2017, [retrieved on May 19, 2018], Internet <URL: https://www.osapublishing.org/abstract.cfm?uri=OFC-2017-M2C.3>

Non Patent Literature 3: Y. K. Huang, et. al., "Filterless Reception of 80x112-Gb/s WDM Channels Using Single-Ended Photodiodes and Digital Interference Reduction", [online], 2012, [retrieved on May 19, 2011], Internet <URL: https://ieeexplore.ieee.org/document/6706291/>

Non Patent Literature 4: Hiroki Kawahara, Four others, "Study of Penalty Caused by Colorless Reception Using Balanced Detection in wavelength multiplexing transmission of 64 Gbaud 64 QAM Signal", IEICE General Conference, B-12-5, 2018.

SUMMARY OF THE INVENTION

Technical Problem

However, the optical reception device using a colorless reception scheme in Non Patent Literature 1 has a problem in that signal quality deteriorates because the beat noise is superposed due to the local light for selecting a signal having a predetermined wavelength from the WDM signal.

The optical reception device 10A illustrated in FIG. 5 based on Non Patent Literature 2 has a problem in that a large number of PDs are required as a whole and mounting costs increase because two PDs for an I channel and two PDs for a Q channel for each of signals having various wavelengths in a WDM signal are required in order to cancel out beat noise in each of first to n-th signals having different wavelengths.

Although the number of PDs in the optical reception device 10B illustrated in FIG. 6 based on Non Patent Literature 3 can be reduced to half compared to the optical reception device 10A, a circuit including the PD 16, the demodulation unit 18, and the sampling clock supply unit 19 for canceling out the beat noise, and the respective demodulation units 17a to 17n with a beat noise cancellation function are separately required. Thus, there is a problem in that mounting costs are increased.

In addition, when the channel increases in speed due to a high baud rate such as 600 Gbps or 1 Tbps signal as in a technology of Non Patent Literature 4, there is a problem in that a CMRR (an index indicating a variation in output characteristics between ports) deteriorates, and adverse effects of the beat noise on signal quality increase.

The present invention has been made in view of such circumstances, and an object of the present invention is to provide an optical reception device capable of canceling out beat noise in a WDM signal to obtain a high-quality signal component, and enabling a configuration thereof to be achieved with low mounting costs.

Means for Solving the Problem

As a means for solving the above problem, an invention according to a first aspect is an optical reception device selecting optical signals having the same wavelength as local light having a predetermined wavelength, with phases of the optical signals being made orthogonal, from a wavelength division multiplexing (WDM) signal in which optical signals having a plurality of different wavelengths are multiplexed, converting the selected optical signals with the orthogonal phases to electrical signals expressed as complex numbers, canceling out beat noises from the electrical signals, and then demodulating the electrical signals to obtain signals of a transmission source, the optical reception device including: a canceler unit, wherein the canceler unit includes: an absolute value calculation unit configured to obtain an absolute value of the complex number expressed by each electrical signal and perform absolute value squaring calculation processing for squaring the absolute value, to generate a signal component including a beat noise component; a scaling unit configured to multiply the beat noise component by a proportional constant to restore beat noises associated with a plurality of wavelengths in each electrical signal; and a subtraction unit configured to subtract the beat noise restored by the scaling unit from each electrical signal to cancel out the beat noise included in each electrical signal.

With this configuration, the canceler unit generates the beat noise from the electrical signal obtained by converting the WDM signal, which is an optical signal, and cancels out the beat noise in the electrical signal with the generated beat noise. Thus, it is possible to cancel out the beat noise in the WDM signal and obtain a high-quality signal component. Further, because the canceler unit can be configured using a digital signal processing circuit on one substrate, the canceler unit can be achieved with low mounting costs.

An invention according to a second aspect is the optical reception device according to claim 1 further including: a connection configuration configured to feed back a signal after the beat noise is canceled out by the subtraction unit to an input side of the absolute value calculation unit, wherein the feedback is repeated a plurality of times.

With this configuration, the beat noise components that slightly remain in the signals output from the subtraction units are fed back, and the feedback beat noise components are further subtracted from the beat noise components in the input electrical signals and canceled out. Through the second cancellation processing and subsequent cancellation processing, it is possible to further reduce the beat noise components remaining in the first cancellation processing.

An invention according to a third aspect is the optical reception device according to claim 1 further including: a demodulation unit configured to demodulate a signal after beat noise cancellation processing output from the subtraction unit; a determination unit configured to compare a voltage level of the demodulated signal to a predetermined threshold value to determine a transmission source signal component with no beat noise of the transmission source; a transmission source restoration unit configured to generate an appropriate transmission source signal with no beat noise of the transmission source according to the transmission source signal component; a second absolute value calculation unit configured to perform the absolute value squaring calculation processing on the appropriate transmission source signal generated by the transmission source restoration unit to generate an accurate beat noise component, and generate a signal component including the generated accurate beat noise component; a synchronizing and scaling unit configured to synchronize the signal component including the accurate beat noise component with each electrical signal, and multiply the accurate beat noise component by a proportional constant to restore a beat noise associated with the appropriate transmission source signal generated by the transmission source restoration unit; and a second subtraction unit configured to cancel out the beat noise included in each electrical signal on the basis of the beat noise restored by the synchronizing and scaling unit.

With this configuration, the transmission source signal component with no beat noise of the transmission source is temporarily determined through a voltage level threshold value determination processing of the determination unit, and the accurate beat noise component is generated from the determined transmission source signal component. Because beat noise in the electrical signal is canceled out on the basis of this accurate beat noise component, it is possible to obtain a signal with no beat noise.

An invention according to a fourth aspect is the optical reception device according to any one of claims 1 to 3, wherein a signal processing circuit constituting the canceler unit is mounted in one semiconductor chip.

With this configuration, it is possible to achieve the optical reception device with low mounting costs because the canceler unit is achieved by one semiconductor chip.

Effects of the Invention

According to the present invention, it is possible to provide an optical reception device capable of canceling out the beat noise in the WDM signal to obtain a high-quality signal component and achieving this configuration with low mounting costs.

DESCRIPTION OF EMBODIMENTS

Hereinafter, embodiments of the present invention will be described with reference to the drawings. However, corresponding components in all of the drawings of the present specification are denoted by the same reference signs, and descriptions thereof will be omitted appropriately.

Configuration of Embodiment

Figure 1:
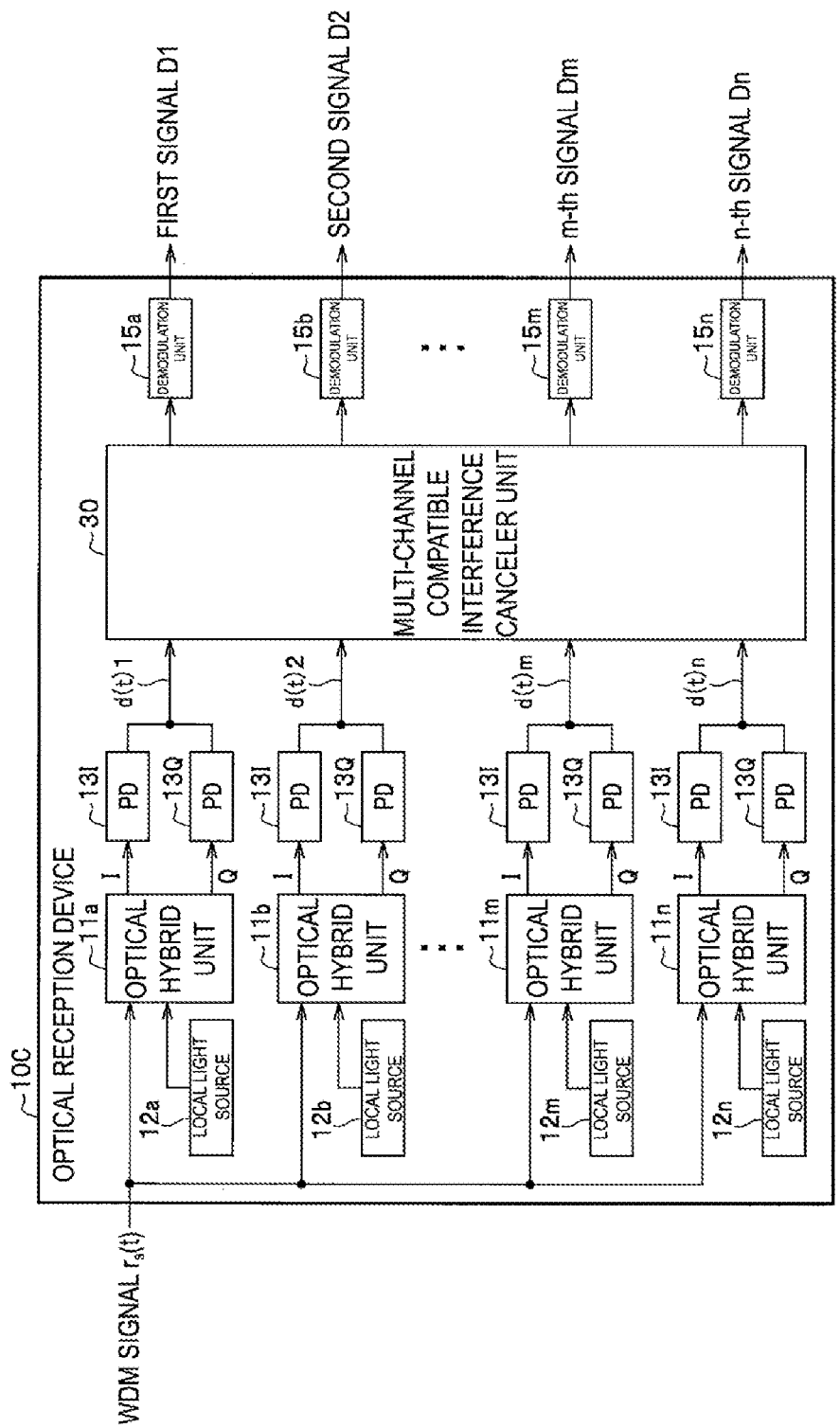
FIG. 1 is a block diagram illustrating a configuration of an optical reception device according to an embodiment of the present invention.

FIG. 1 is a block diagram illustrating a configuration of an optical reception device 10C according to an embodiment of the present invention.

Figure 6:
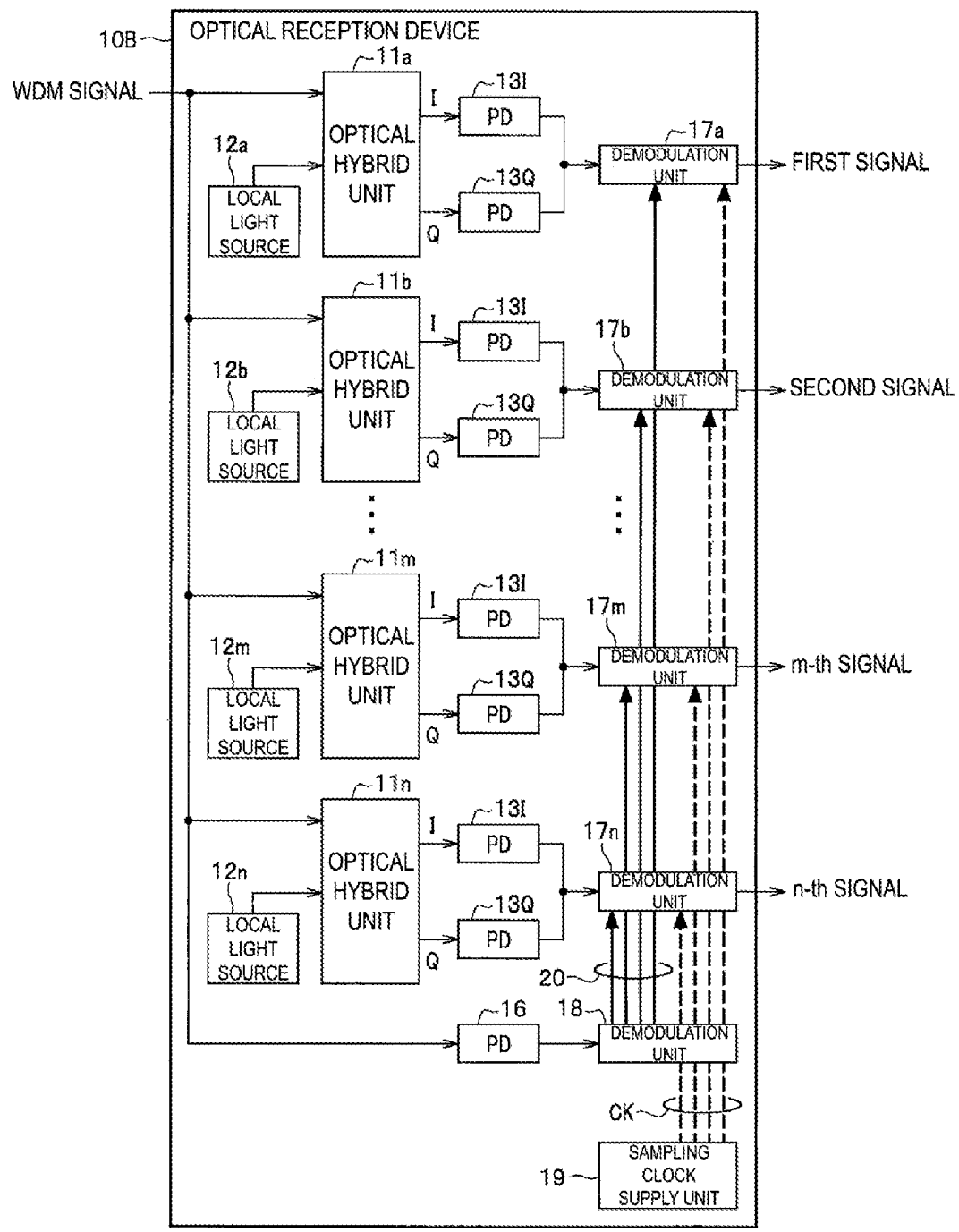
FIG. 6 is a block diagram illustrating a configuration of an optical reception device using a digital coherent WDM transmission scheme using single-type detection of the related art.

The optical reception device 10C illustrated in FIG. 1 is of a single ended type that is the same as that illustrated in FIG. 6, and includes n optical hybrid units 11a to 11n, n local light sources 12a to 12n, PDs 13I connected to I ports on the output side of the respective optical hybrid units 11a to 11n, and PDs 13Q connected to Q ports on the output side of the respective optical hybrid units 11a to 11n.

Figure 5:
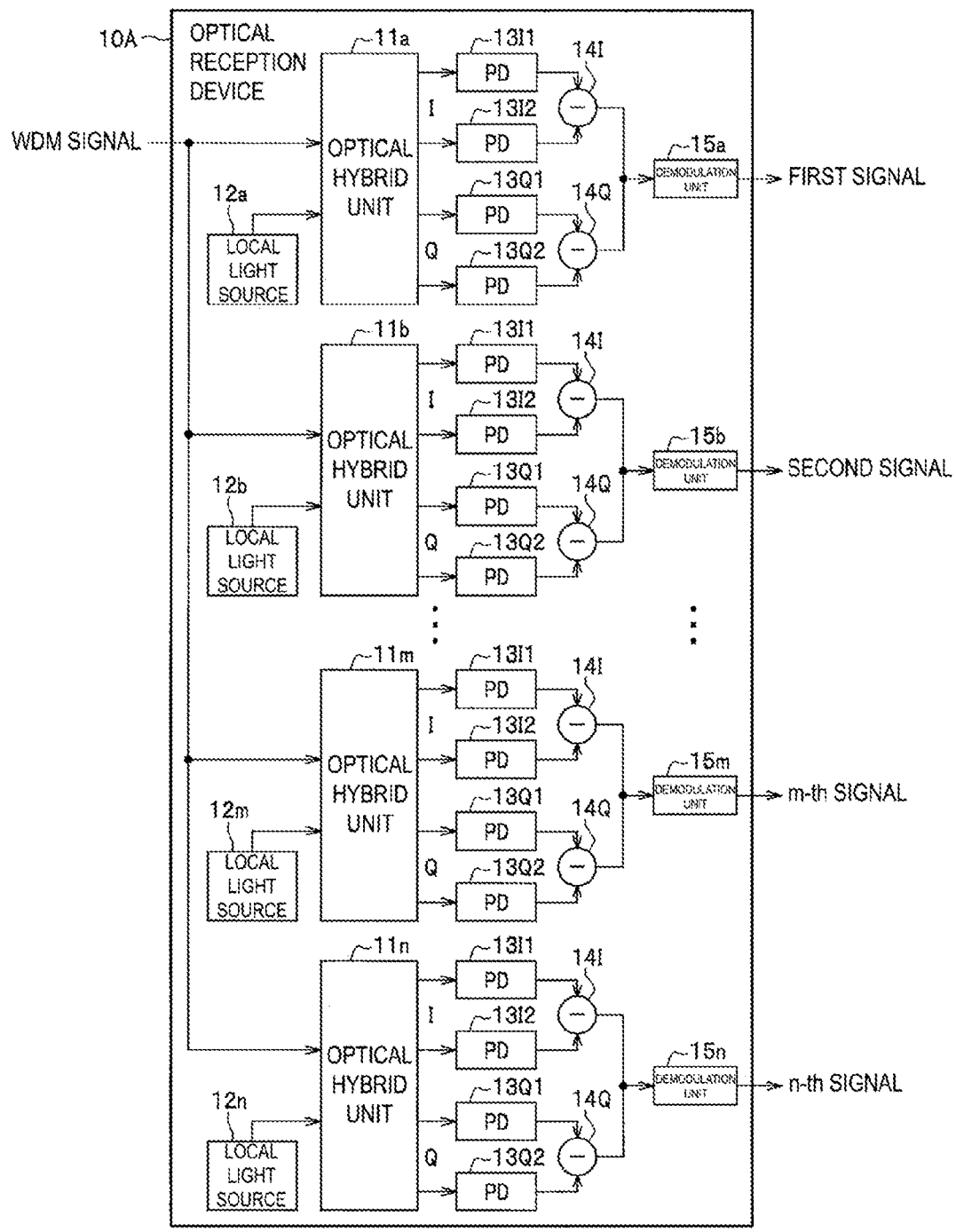
FIG. 5 is a block diagram illustrating a configuration of an optical reception device using a colorless reception scheme using balanced detection of the related art.

Further, the optical reception device 10C includes a multi-channel compatible interference canceler unit (also referred to as a canceler unit) 30, which is a characteristic element of the embodiment, and demodulation units 15a to 15n that are the same as those illustrated in FIG. 5.

Figure 2:
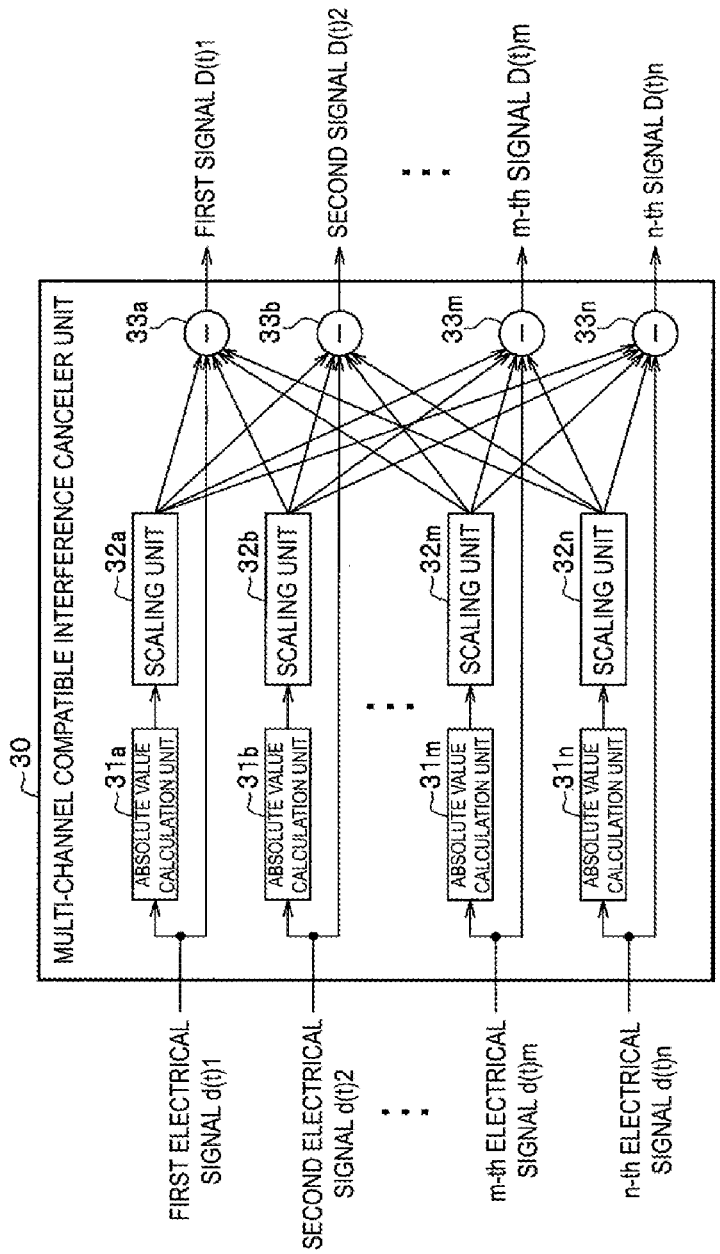
FIG. 2 is a block diagram illustrating a configuration of a canceler unit in the optical reception device according to the embodiment.

The canceler unit 30 includes n absolute value calculation units 31a, 31b, . . . , 31m, and 31n, n scaling units 32a, 32b, . . . , 32m, and 32n, and n subtraction units 33a, 33b, . . . , 33m, and 33n, as illustrated in FIG. 2. The canceler unit 30 is configured by forming a signal processing circuit constituting the canceler unit 30 on one substrate, or is configured by mounting a signal processing circuit constituting the canceler unit 30 in one semiconductor chip.

The optical hybrid units 11a to 11n illustrated in FIG. 1 extract an optical signal having the same wavelength as that of the local light by causing an input WDM signal $r_s(t)$ and the local light having the first to n-th wavelengths of the respective local light sources 12a to 12n to optically interfere in an optical waveguide, and output the extracted signal light from the I port and the Q port, with phases of the optical signal being made orthogonal. Optical signals of an I channel from the I ports of the optical hybrid units 11a to 11n are converted to electrical signals in the PD 13I, and optical signals of the Q channel from the Q ports are converted to electrical signals in the PD 13Q.

The above WDM signal $r_s(t)$ is expressed by Equation (1) below.

[Math. 1]

$$r_S(t) = m_S(t)e^{j\omega_{cs}} + \sum_{i=1}^{N-1} m_i(t)e^{j\omega_{ci}} \quad (1)$$

Here, a first term on the right side indicates signal components selected by local light from the n local light sources 12a to 12n, and indicates n signal components having a frequency matching a frequency of each local light. A second term on the right side indicates a signal including a beat noise component.

The electrical signals of the I and Q channels for each wavelength obtained by converting the optical signals by the respective optical hybrid units 11a to 11n are input to the canceler unit 30 illustrated in FIG. 2 in a state in which the electrical signals are plotted on a complex plane with orthogonal I and Q axes, that is, as electrical signals that are complex values.

For the electrical signal input to the canceler unit 30, a signal associated with the first wavelength output from the optical hybrid unit 11a is set as a first electrical signal d(t)1, a signal associated with the second wavelength output from the optical hybrid unit 11b is set as a second electrical signal d(t)2; . . . , a signal associated with the m-th wavelength output from the optical hybrid unit 11m is set as the m-th electrical signal d(t)m, and a signal associated with the n-th wavelength output from the optical hybrid unit 11n is set as the n-th electrical signal d(t)n.

In the canceler unit 30, the absolute value calculation unit 31a obtains an absolute value of the complex number, which is the first electrical signal d(t)1, and performs absolute value squaring calculation processing for squaring the absolute value to generate a signal component including a beat noise component as a baseband signal. Similarly, the other absolute value calculation units 31b to 31n perform the absolute value squaring calculation processing on each of the second to n-th electrical signals d(t)2 to d(t)n to generate a signal component including a beat noise component as a baseband signal.

For example, the baseband signal generated through the absolute value squaring calculation processing is expressed as in Equations (2a) and (2b) below. Here, only an I channel component is expressed. A Q channel is omitted because the Q channel is the same.

[Math. 2]

$$d(t) = \left| Ae^{j\omega_{cs}} + m_S(t)e^{j\omega_{cs}} + \sum_{i=1}^{N-1} m_i(t)e^{j\omega_{ci}} \right|^2 \quad (2a)$$

$$\approx 2Am_S(t) + \sum_{i=1}^{N-1} |m_i(t)|^2 \quad (2b)$$

In the above Equation (2a), a first term on the right side is local light, a second term on the right side is the same signal component as in the first term of Equation (1) above, and a third term on the right side is a signal including the same beat noise component as in the second term of Equation (1).

Equation (2b) is expressed as being approximately equal because some of various signal terms calculated in the absolute value squaring calculation processing of Equation (2a) are negligible. A first term on the right side of the approximately equal sign indicates a signal component, and a second term on the right side indicates a beat noise component that is to be canceled.

The scaling units 32a to 32n multiply each beat noise component after the absolute value squaring calculation processing by a proportional constant to restore the beat noise of each of the electrical signals d(t)1 to d(t)n. These restored beat noises are input to the respective subtraction units 33a to 33n.

For the subtraction units 33a to 33n, for example, the subtraction unit 33a subtracts the n types of restored beat noises from the first electrical signal d(t)1, and cancels out all (n types of) beat noises included in the first electrical signal d(t)1. That is, all the beat noises output from the respective scaling units 32a to 32n are subtracted from all the beat noises of the WDM signal $r_s(t)$ included in the first electrical signal d(t)1 such that all the beat noises are canceled out.

Through this cancellation, the first signal D(t)1 that is a signal component of the first electrical signal d(t)1 is output from the subtraction unit 33a, a second signal D(t)2 that is a signal component of the second electrical signal d(t)2 is output from the subtraction unit 33b, . . . , an m-th signal D(t)m that is a signal component of the m-th electrical signal d(t)m is output from the subtraction unit 33m, and an n-th signal D(t)n that is a signal component of the n-th electrical signal d(t)n is output from the subtraction unit 33n.

The respective electrical signals d(t)1 to d(t)n after the beat noises are canceled out are expressed by Equations (3a) and (3b) below.

[Math. 3]

$$D(t) = d(t) - \gamma \sum_{i=1}^{N-1} |d(t)|^2 \quad (3a)$$

$$\approx 2Am_S(t) + \sum_{i=1}^{N-1} |m_i(t)|^2 - \gamma \cdot 4A^2 \sum_{\substack{i=1 \\ (i \neq S)}}^{N-1} |m_i(t)|^2 \quad (3b)$$

D(t) in Equation (3a) above indicates a first signal D(t)1 obtained by subtracting, from the first electrical signal d(t)1, all the beat noise components restored from the electrical signal d(t)1. Similarly, D(t) indicates respective signals D(t)2 to D(t)n obtained by subtracting, from the respective other electrical signals d(t)2 to d(t)n, all of the beat noise components restored from the respective electrical signals d(t)2 to d(t)n.

A right side of Equation (3b) above indicates that the beat noise component of a second term is canceled out with the beat noise component of a third term, and only the signal component of the first term is left. The proportional constant γ in the third term is appropriately selected in order to perform this cancellation, in other words, to cancel out the beat noise component. That is, γ is a parameter that is adjustable for cancellation, and is provided to be adjustable in the subtraction units 33a to 33n.

The respective signals D(t)1 to D(t)n obtained in this manner are demodulated by the demodulation units 15a to 15n illustrated in FIG. 1, and first to n-th signals D1 to Dn of the transmission source are obtained.

Operation of Embodiment

Next, an operation of the optical reception device 10C according to the embodiment will be described. A representative case in which the first signal D(t)1, which is a signal component, is obtained from the WDM signals $r_s(t)$ will be described herein.

When the WDM signal $r_s(t)$ illustrated in FIG. 1 is input to the optical hybrid unit 11a, an optical signal having the same wavelength as the local light having the first wavelength from the local light source 12a is extracted from the WDM signals $r_s(t)$. Further, in the optical hybrid unit 11a, first optical signals of the I and Q channels in which the extracted signals are orthogonal are output from the I and Q ports. The first optical signal of the I channel output from the I port is converted to an electrical signal in the PD 13I, and the optical signal of the Q channel output from the Q port is converted to an electrical signal in the PD 13Q.

The electrical signals of the I and Q channels for each wavelength after the conversion are input to the canceler unit 30 illustrated in FIG. 2 as the first electrical signal d(t)1, which is a complex value in an orthogonal state.

The input first electrical signal d(t)1 is subjected to an absolute value squaring calculation processing by the absolute value calculation unit 31a, and a signal component including the beat noise component is generated. Then, in the scaling unit 32a, the beat noise component is multiplied by the proportional constant, thereby restoring all of the beat noises included in the electrical signal d(t)1. These restored beat noises are input to the respective subtraction units 33a to 33n.

In the subtraction unit 33a, all of the above restored beat noises are subtracted from the first electrical signal d(t)1, thereby canceling out all the beat noises included in the first electrical signal d(t)1. Through this cancellation, the first signal D(t)1, which is a signal component of the first electrical signal d(t)1, is output. This first signal D(t)1 is demodulated by the demodulation unit 15a illustrated in FIG. 1, so that the first signal D1 of the transmission source is obtained.

Effects of Embodiment

An effect of the optical reception device 10C according to the embodiment will be described. This optical reception device 10C extracts optical signals having the same wavelength as the local light having a predetermined wavelength from the WDM signal $r_s(t)$ in which optical signals having n types of different wavelengths are multiplexed, with phases of the optical signals being made orthogonal, converts the extracted optical signals having the orthogonal phase to electrical signals d(t)1 to d(t)n expressed as a complex number, cancels out beat noise from the electrical signals d(t)1 to d(t)n, and then demodulates the signals to obtain the signals D1 to Dn of a transmission source.

A characteristic of the embodiment is that the optical reception device 10C includes the canceler unit 30 including the absolute value calculation units 31a to 31n, the scaling units 32a to 32n, and the subtraction units 33a to 33n.

The absolute value calculation units 31a to 31n obtain the absolute values of the complex numbers, which are the electrical signals d(t)1 to d(t)n and perform the absolute value squaring calculation processing for squaring the absolute values to generate the signal components including the beat noise components.

The scaling units 32a to 32n multiply the generated beat noise components by the proportional constant to restore the beat noises associated with the n types of wavelengths in the electrical signals d(t)1 to d(t)n.

The subtraction units 33a to 33n subtract the n types of restored beat noises from the respective electrical signals d(t)1 to d(t)n, and cancel out the n types of beat noises included in the electrical signals d(t)1 to d(t)n.

With this configuration, one canceler unit 30 generates the beat noises from the electrical signals d(t)1 to d(t)n obtained by converting the WDM signal $r_s(t)$, which is an optical signal, and cancels out the beat noises in the electrical signals d(t)1 to d(t)n with the generated beat noises. Thus, it is possible to cancel out the beat noises in the WDM signal $r_s(t)$ and obtain a high-quality signal component. Further, because the canceler unit 30 can be configured using one digital signal processing circuit, the canceler unit 30 can be achieved with low mounting costs.

Modification Example 1 of Embodiment

Figure 3:
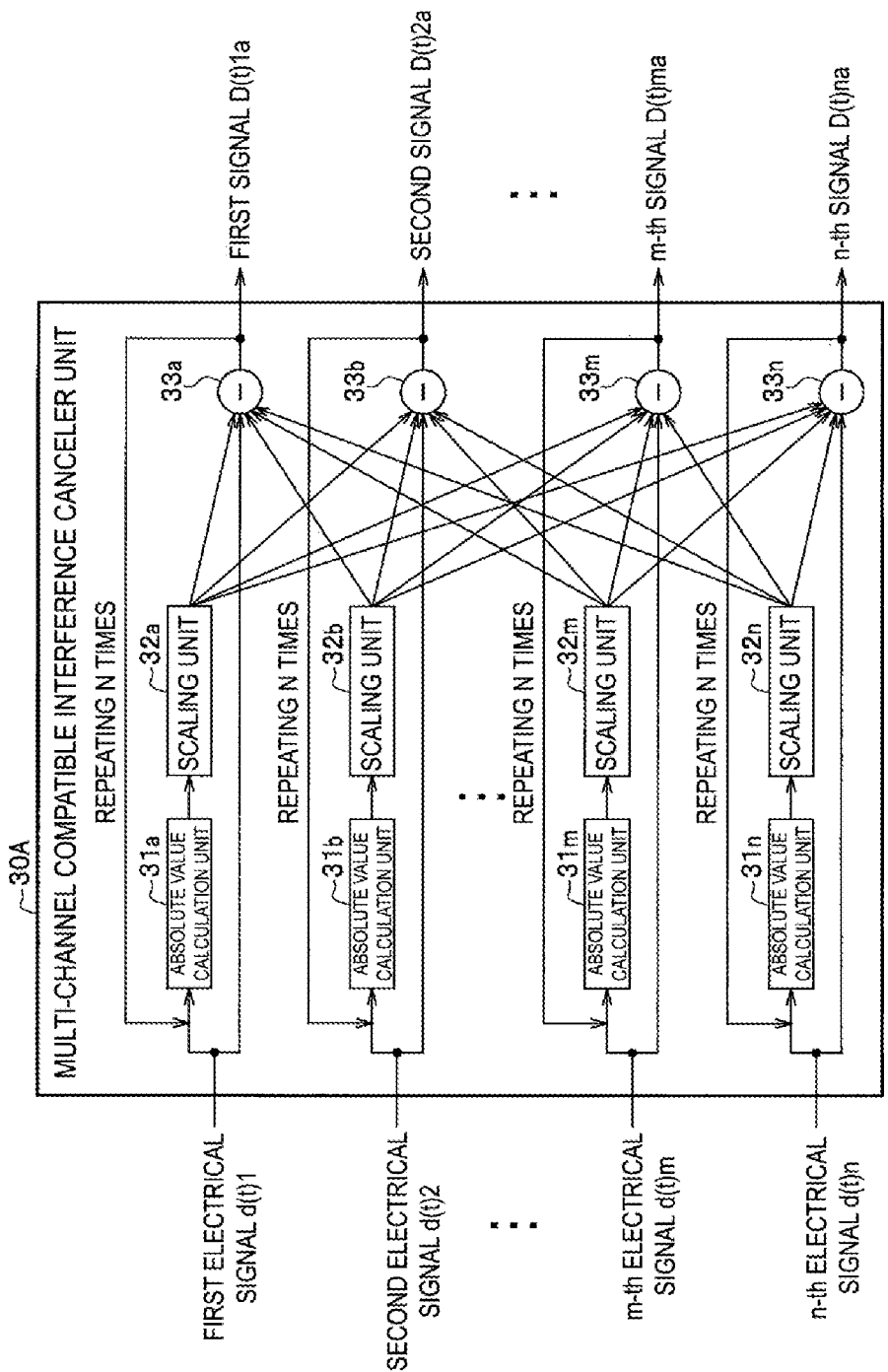
FIG. 3 is a block diagram illustrating a configuration of a canceler unit according to Modification Example 1 of the embodiment.

FIG. 3 is a block diagram illustrating a configuration of a multi-channel compatible interference canceler unit 30A according to Modification Example 1 of the embodiment.

The canceler unit 30A illustrated in FIG. 3 is different from the above-described canceler unit 30 (FIG. 2) in a connection configuration in which first to n-th signals D(t)1a to D(t)na after beat noise cancellation output from the subtraction units 33a to 33n are fed back to input sides of the absolute value calculation units 31a to 31n. This feedback is repeated N times (a plurality of times).

By repeating the feedback N times, the beat noise component can be canceled out so that the beat noise components do not substantially remain in the first to n-th signals D(t)1a to D(t)na.

As described above, when the processing of canceling out the beat noise component of the second term on the right side with the third term in Equation (3b) above is performed only once, a state in which the beat noise component cannot be completely canceled out occurs. In the first cancellation processing, that is, one cancellation processing using the absolute value calculation units 31a to 31n, the scaling units 32a to 32n, and the subtraction units 33a to 33n, the entire right side of Equation (2b) above is substituted into d(t) of $|d(t)|^2$ in the second term on the right side of Equation (3a). Thus, the beat noise components cannot be completely canceled out in some cases.

Thus, when the first to n-th signals D(t)1a to D(t)na are fed back to the input sides of the absolute value calculation units 31a to 31n, the entire right side of Equation (3b) is substituted into d(t) of $|d(t)|^2$ in the second term on the right side of Equation (3a) in second cancellation processing.

The second cancellation processing is different from the first cancellation processing in that the equation substituted into d(t) of $|d(t)|^2$ in the second term on the right side of Equation (3a) does not include a third term on the right side of Equation (3b) in the first cancellation processing, but includes the third term on the right side of Equation (3b) in the second cancellation processing. That is, in the second and subsequent feedbacks, there is the third term on the right side of Equation (3b). This third term serves to gradually cancel out the beat noise component. That is, as the feedback is repeated two times, three times, and so on, the beat noise component is gradually canceled out.

Thus, the beat noise components that remain slightly in the first to n-th signals D(t)1a to D(t)na output from the subtraction units 33a to 33n are fed back, and the feedback beat noise components are further subtracted from the beat noise components in the input electrical signals d(t)1 to d(t)n and canceled out. Through the second cancellation processing and subsequent cancellation processing, it is possible to further reduce the beat noise components remaining in the first cancellation processing.

Modification Example 2 of Embodiment

Figure 4:
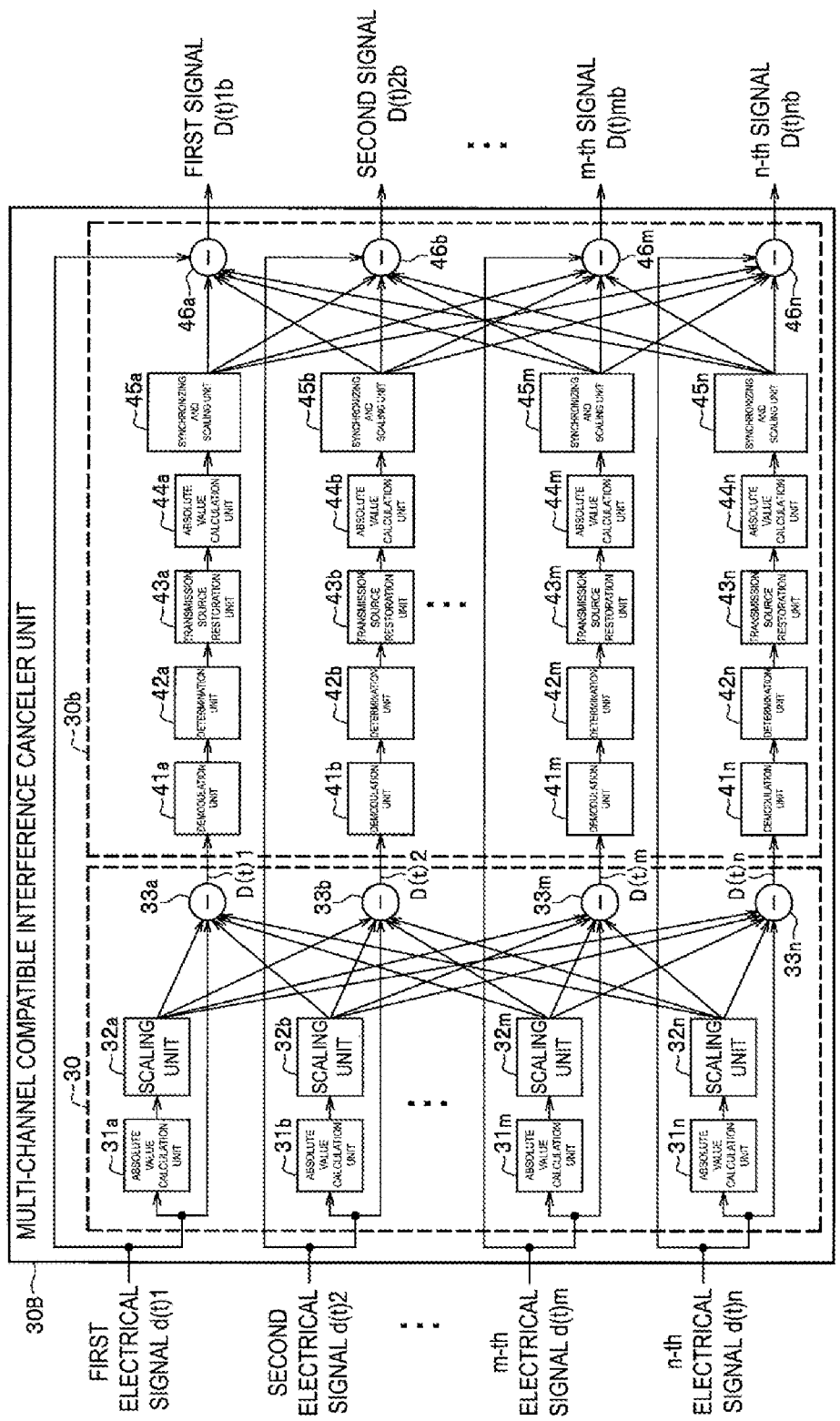
FIG. 4 is a block diagram illustrating a configuration of a canceler unit according to Modification Example 2 of the embodiment.

FIG. 4 is a block diagram illustrating a configuration of a multi-channel compatible interference canceler unit 30B according to Modification Example 2 of the embodiment.

The canceler unit 30B illustrated in FIG. 4 includes demodulation units 41a to 41n, determination units 42a to 42n, transmission source restoration units 43a to 43n, absolute value calculation units (second absolute value calculation units) 44a to 44n, synchronizing and scaling units 45a to 45n, and subtraction units (second subtraction units) 46a to 46n, as illustrated in a broken line frame 30b, in addition to the components of the canceler unit 30 (FIG. 2) described above. Here, the canceler unit 30B has a connection configuration in which the electrical signals d(t)1 to d(t)n are directly input to the subtraction units 46a to 46n at a last stage.

The canceler unit 30B includes n systems with the same circuits that process the n electrical signals d(t)1 to d(t)n. Thus, characteristics of the embodiment will be described with, as a representative, a circuit of a first system that processes the first electrical signal d(t)1. That is, the characteristics will be described with, as a representative, a circuit including the absolute value calculation unit 31a, the scaling unit 32a, the subtraction unit 33a, the demodulation unit 41a, the determination unit 42a, the transmission source restoration unit 43a, the absolute value calculation unit 44a, the synchronizing and scaling unit 45a, and the subtraction unit 46a, which is the circuit of the first system.

The demodulation unit 41a demodulates the signal D(t)1, which is a signal component after beat noise cancellation output from the subtraction unit 33a. However, the beat noise component may remain in the signal D(t)1 output from the subtraction unit 33a as described above.

The determination unit 42a determines a voltage level of a transmission source signal by comparing a voltage level of the demodulated signal with a predetermined threshold value, and determines a signal component with no beat noise of the transmission source (referred to as a transmission source signal component).

The transmission source signal is transmitted in some discrete voltage patterns such as 5 V, 10 V, and 15 V. A beet noise is included in this transmission source signal and, for example, the transmission source signal transmitted at 5 V has a voltage of 4.5 V, 5.5 V, or the like due to superposition of the beat noise or has a voltage of 8 V or the like due to the superposition of beat noise when fluctuation is large. Such a fluctuating signal is transmitted.

The determination unit 42a sets, for example, 7.5 V, which is a middle between 5 V and 10 V, as the threshold value when the determination unit 42a performs the determination using the threshold value. The determination unit 42a determines that the transmission source signal has been transmitted at 10 V when the voltage level exceeds the threshold value of 7.5 V, and determines that the transmission source signal has been transmitted at 5 V when the voltage level is 7.5 V or less. This determination is referred to as a voltage threshold value determination processing.

In practice, there is a case in which the determination is erroneous because the beat noise is included in the transmission source signal as described above. For example, when the transmission source signal has been transmitted at 5 V, but has had a voltage of 8 V due to the beat noise included in the transmission source signal, the determination unit 42a may erroneously determine that the transmission source signal is a transmission source signal that has been transmitted at 10 V. However, the erroneous determination is extremely rare and is within an allowable error range for appropriately determining the transmission source signal component.

A signal for which a transmission voltage level has been determined through the voltage threshold value determination processing by the determination unit 42a is only a transmission source signal component with no beat noise component.

The transmission source restoration unit 43a performs processing of generating an appropriate transmission source signal with no beat noise of the transmission source according to the transmission source signal component.

The absolute value calculation unit 44a performs the absolute value squaring calculation processing on the appropriate transmission source signal to generate an accurate beat noise component, and generates a signal component including this accurate beat noise component. That is, the accurate beat noise component is a beat noise component that is relevant only to the appropriate transmission source signal.

The synchronizing and scaling unit 45a synchronizes the signal component including the accurate beat noise component with the electrical signal d(t)1 and multiplies the accurate beat noise component by the proportional constant through scaling processing to restore the beat noise relevant to the appropriate transmission source signal. This beat noise is input to the respective subtraction units 46a to 46n. That is, n types of beat noises are input to the one subtraction unit 46a.

The subtraction unit 33a subtracts the n types of beat noises from the first electrical signal d(t)1 to cancel out all the beat noises and obtain the first signal D(t)1b of only the signal component.

With the canceler unit 30B having such a configuration, the transmission source signal component with no beat noise of the transmission source is temporarily determined through the voltage threshold value determination processing, and the accurate beat noise component is generated from the determined transmission source signal component. Because the beat noise in the electrical signal d(t)1 is canceled out on the basis of the accurate beat noise component, it is possible to obtain the signal D(t)1b with no beat noise.

In addition, a specific configuration can be changed appropriately without departing from the gist of the present invention.

REFERENCE SIGNS LIST

10C Optical reception device
11a to 11n Optical hybrid unit
12a to 12n Local light source
13I, 13Q PD
15a to 15n Demodulation unit
30, 30A, 30B Multi-channel compatible interference canceler unit (canceler unit)
31a to 31n Absolute value calculation unit
32a to 32n Scaling unit
33a to 33n Subtraction unit
41a to 41n Demodulation unit
42a to 42n Determination unit
43a to 43n Transmission source restoration unit
44a to 44n Absolute value calculation unit (second absolute value calculation unit)
45a to 45n Synchronizing and scaling unit
46a to 46n Subtraction unit (second subtraction unit)

The invention claimed is:

1. An optical reception device configured to select optical signals having same wavelength as local light with a predetermined wavelength, phases of the optical signals are orthogonal, to each wavelength of wavelength division multiplexing (WDM) signal in which optical signals having a plurality of different wavelengths are multiplexed, convert the selected optical signals with their orthogonal phases into electrical signals and expressed as complex numbers, cancel out beat noises from the electrical signals, and demodulate the electrical signals to obtain signals of a transmission source, the optical reception device comprising:
 a signal processing circuit configured to:
 obtain an absolute value of complex number expressed by each electrical signal and perform absolute value squaring calculation processing for squaring the absolute value, to generate a signal component including a beat noise component;
 multiply the beat noise component by a proportional constant to restore beat noises associated with a plurality of wavelengths in each electrical signal; and
 subtract the restored beat noises from each electrical signal to cancel out the beat noises included in each electrical signal.

2. The optical reception device according to claim 1, wherein the signal processing circuit is further configured to:
 feedback a signal after the beat noise is canceled out, wherein the feedback is repeated a plurality of times.

3. The optical reception device according to claim 1, wherein the signal processing circuit is further configured to:
 demodulate a signal after the beat noise cancellation is processed;
 compare a voltage level of the demodulated signal to a predetermined threshold value to determine a transmission source signal component with no beat noise of the transmission source;
 generate an appropriate transmission source signal with no beat noise of the transmission source according to the transmission source signal component;
 perform the absolute value squaring calculation processing on the generated transmission source signal to generate an accurate beat noise component, and generate a signal component including the generated accurate beat noise component;
 synchronize the signal component including the accurate beat noise component with each electrical signal, and multiply the accurate beat noise component by a proportional constant to restore a beat noise associated with the generated transmission source signal; and
 cancel out the beat noise included in each electrical signal on the basis of the restored beat noise.

4. The optical reception device according to claim 1, wherein the signal processing circuit is mounted in a semiconductor chip.

5. The optical reception device according to claim 1, wherein the transmission source signal is transmitted in discrete voltage patterns.

* * * * *